US008280355B1

(12) United States Patent
Jones

(10) Patent No.: US 8,280,355 B1
(45) Date of Patent: Oct. 2, 2012

(54) METHOD AND SYSTEM TO DETERMINE THE VELOCITY OF A MOBILE COMMUNICATION DEVICE

(75) Inventor: Bryce A. Jones, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1154 days.

(21) Appl. No.: 11/763,709

(22) Filed: Jun. 15, 2007

(51) Int. Cl.
*H04M 3/42* (2006.01)

(52) U.S. Cl. ............... 455/414.1; 455/456.1; 455/456.2; 701/117; 370/336

(58) Field of Classification Search .................. 370/336; 455/414.1, 456.1–456.2; 701/117, 201, 209
See application file for complete search history.

(56) References Cited

U.S. PATENT DOCUMENTS

| | | | | |
|---|---|---|---|---|
| 5,790,052 | A * | 8/1998 | Grabow | 340/928 |
| 6,055,434 | A * | 4/2000 | Seraj | 455/456.1 |
| 6,472,978 | B1 * | 10/2002 | Takagi et al. | 340/435 |
| 6,728,629 | B2 * | 4/2004 | Oka et al. | 701/200 |
| 6,842,620 | B2 | 1/2005 | Smith et al. | |
| 7,477,903 | B2 * | 1/2009 | Wilcock et al. | 455/456.1 |
| 2003/0050754 | A1 * | 3/2003 | Edwards et al. | 701/209 |
| 2003/0069683 | A1 * | 4/2003 | Lapidot et al. | 701/117 |
| 2003/0078055 | A1 * | 4/2003 | Smith et al. | 455/456 |
| 2003/0187571 | A1 * | 10/2003 | Impson et al. | 701/117 |
| 2004/0049336 | A1 * | 3/2004 | Knockeart et al. | 701/201 |
| 2004/0149939 | A1 * | 8/2004 | Dickson et al. | 250/559.12 |
| 2005/0197767 | A1 * | 9/2005 | Nortrup | 701/209 |
| 2006/0106530 | A1 * | 5/2006 | Horvitz et al. | 701/117 |
| 2006/0187017 | A1 | 8/2006 | Kulesz et al. | |
| 2007/0027572 | A1 * | 2/2007 | Koyama et al. | 700/211 |
| 2007/0061155 | A1 | 3/2007 | Ji et al. | |

OTHER PUBLICATIONS

Federal Highway Administration Office of Travel Management; "Guidance on Including ITS Elements in Transportation Projects;" Jan. 2001; 21 pages.

* cited by examiner

*Primary Examiner* — Jinsong Hu
*Assistant Examiner* — Nathan Taylor

(57) ABSTRACT

A plurality of beacons transmit beacon signals indicating beacon identifiers. A mobile communication device receives a first one of the beacon signals indicating a first one of the beacon identifiers when the mobile communication device is proximate to a first one of the beacons. The mobile communication device generates a random code and transmits a first message indicating the first beacon identifier and the random code. The mobile communication device receives a second one of the beacon signals indicating a second one of the beacon identifiers when the mobile communication device is proximate to a second one of the beacons and transmits a second message indicating the second beacon identifier and the random code. A computer system receives the first message and the second message and processes the random code, the first beacon identifier, and the second beacon identifier to determine the velocity of the mobile communication device.

26 Claims, 5 Drawing Sheets

METHOD AND SYSTEM TO DETERMINE THE VELOCITY OF A MOBILE COMMUNICATION DEVICE

BACKGROUND OF THE INVENTION

1. Field of the Invention

The invention is related to the field of communications, and in particular, to a monitoring system that provides real-time data on the velocity of a mobile communication device.

2. Description of the Prior Art

Existing traffic monitoring systems use various sensors, such as radar devices and video cameras, to collect traffic data. Such monitoring systems are expensive to install and maintain. In addition, these systems only monitor a very limited portion of the nation's roadways.

Other existing traffic monitoring systems work with mobile telephone carriers to gather and analyze data on cellular tower handoff frequency. Unfortunately, this data is not anonymous. It contains personal information that can be tied back to individuals. Personal identifying information is disassociated from the data record only after it is already in the monitoring system. Thus, these systems raise privacy concerns that inhibit further deployment.

Another drawback of traffic monitoring systems that work in conjunction with mobile telephone carriers is the burden placed on cellular base stations. These monitoring systems require additional processing in the cellular base stations to deliver the handoff data in real-time. Alternatively, these monitoring systems deliver handoff data through batch reporting. While the batch reporting is less taxing on the cellular system, the value of the data is greatly diminished because real-time traffic reporting is not possible.

None of the existing traffic monitoring systems provide reliable, accurate, inexpensive, anonymous, real-time, nation-wide traffic reporting that does not excessively burden the cellular network.

SUMMARY

A traffic monitoring system described herein solves the problems described above. The traffic monitoring system anonymously monitors the volume and velocity of traffic on roadways. The traffic monitoring system utilizes low-cost roadside radio frequency beacons that do not tax the cellular system. As a motorist passes one of the beacons, their wireless communication device receives a beacon identifier and generates a random anonymous code. The random anonymous code changes periodically and cannot be tied back to the motorist. The wireless communication device then transmits the beacon identifier and the random code to the traffic monitoring system. The traffic monitoring system processes the data received from the wireless communication device to determine the velocity of the motor vehicle. As the traffic monitoring system receives data from a plurality of wireless communication devices, it generates real-time reports on traffic volume and velocity.

DETAILED DESCRIPTION OF THE PREFERRED EMBODIMENT

Figure 1:
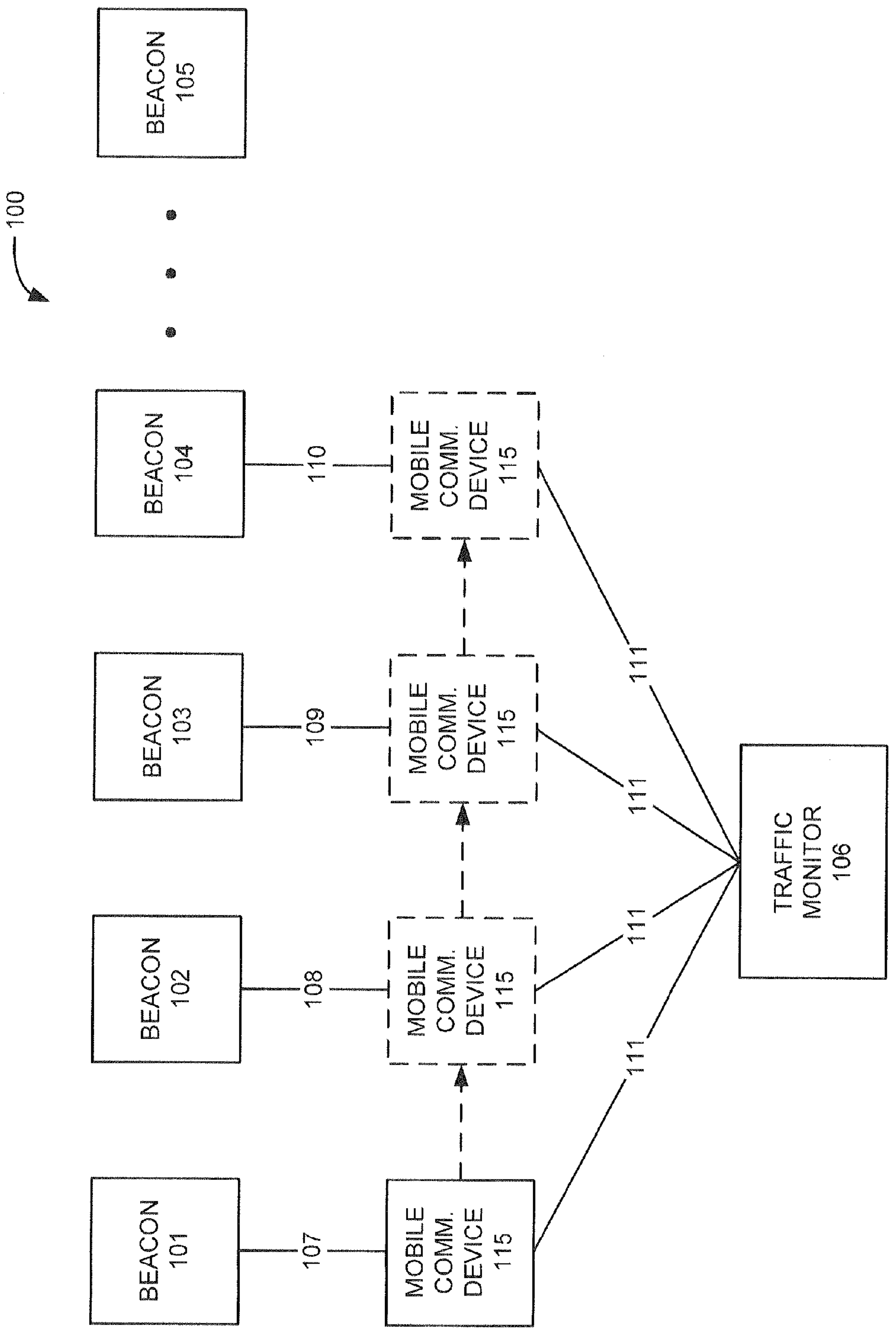
FIG. 1 illustrates a monitoring system in an embodiment of the invention.

FIG. 1 illustrates monitoring system 100 in an embodiment of the invention. Monitoring system 100 monitors the velocity of mobile communication device 115. Monitoring system 100 comprises beacons 101-105, traffic monitor 106, and mobile communication device 115.

Beacons 101-105 comprise wireless transmission control circuitry. Beacons 101-105 transmit beacon signals indicating beacon identifiers. The beacon identifiers uniquely identify each one of beacons 101-105 or their geographic location. Beacons 101-105 use Bluetooth, Wireless Fidelity (Wi-Fi), Worldwide Interoperability for Microwave Access (WiMAX), Radio Frequency (RF), or some other form of wireless communication. Typically, the beacon signals have a limited range, so mobile communication device 115 only receives a given beacon signal when it is in range and proximate to the respective beacon.

Mobile communication device 115 comprises a telephone, an internet appliance, or some other wireless transceiver and control circuitry. Mobile communication device 115 generates a random code that is anonymous within monitoring system 100 and external systems. Mobile communication device 115 receives a beacon identifier when it is proximate to one of beacons 101-105, and in response, transmits a message comprising the beacon identifier and the random code. Although not required in all embodiments, mobile communication device 115 typically timestamps the message by placing the current time of day in the message indicating when the mobile communication device 115 is proximate to one of beacons 101-105.

Traffic monitor 106 comprises a computer system. Traffic monitor 106 receives the message from mobile communication device 115 and processes the message to determine the velocity of mobile communication device 115. Velocity determination entails dividing the distance between respective beacons by the time taken for mobile communication device 115 to travel between the beacons. Traffic monitor 106 may maintain a data structure that correlates the beacon identifiers to geographic locations or distances for use in velocity determination. In addition, the distance between two beacons may be determined over roadways instead of the direct distance (as the crow flies) between the beacons.

Beacons 101-104 and mobile communication device 115 are sequentially coupled by links 107-110 as mobile communication device 115 moves within proximity of each one of beacons 101-104, as indicated by the dashed arrows. Links 107-110 comprise Bluetooth, Wi-Fi, WiMAX, or any form of wireless communication that could transmit from beacons 101-104 to mobile communication device 115.

Mobile communication device 115 and traffic monitor 106 communicate over link 111. Link 111 comprises a wireless communication link using Wi-Fi, WiMAX, Code Division Multiple Access (CDMA), Global System for Mobile Communication (GSM), or some other form of wireless communication. Link 111 may be a direct wireless link or may comprise various intermediate systems and components. For example, link 111 might comprise a direct WiMAX link between mobile communication device 115 and traffic monitor 106, or link 111 might comprise a WiMAX link between mobile communication device 115 and a base station where the base station is coupled to traffic monitor 106 over the Internet.

Figure 2:
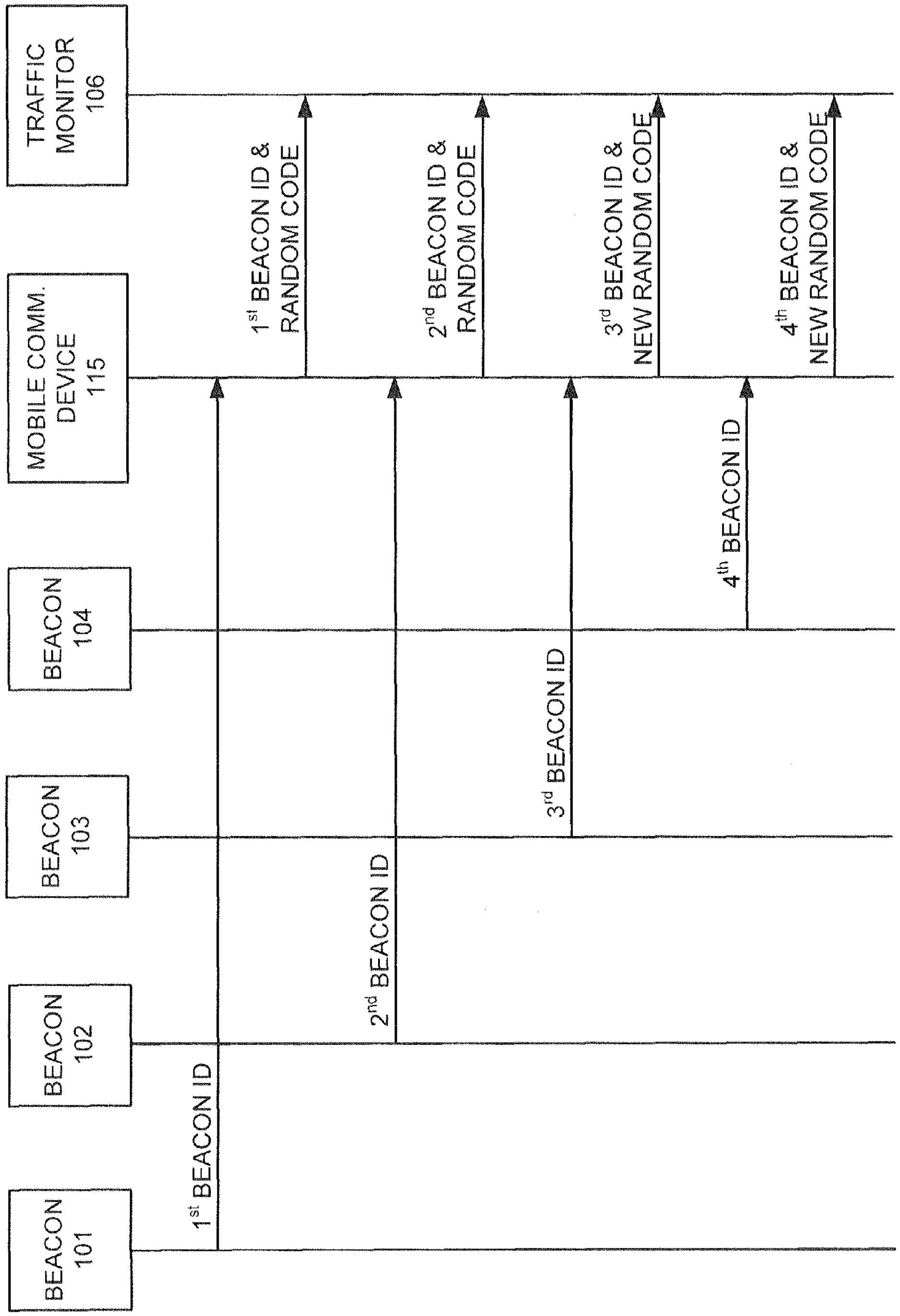
FIG. 2 illustrates the operation of the monitoring system in an embodiment of the invention.

FIG. 2 illustrates the operation of monitoring system 100 in an embodiment of the invention. Beacon 101 transmits a beacon signal indicating a first beacon identifier. Mobile communication device 115 receives the beacon signal indicating the first beacon identifier when device 115 is proximate to beacon 101. Mobile communication device 115 generates a random code and transmits the first beacon identifier and the random code to traffic monitor 106. Beacon 102 transmits a beacon signal indicating a second beacon identifier. Mobile communication device 115 receives the beacon signal indicating the second beacon identifier when device 115 is proximate to beacon 102. Mobile communication device 115 transmits the second beacon identifier and the random code to traffic monitor 106. Traffic monitor 106 then processes the messages to determine the velocity of mobile communication device 115 between beacons 101-102.

Beacon 103 transmits a beacon signal indicating a third beacon identifier. Mobile communication device 115 receives the beacon signal indicating the third beacon identifier when device 115 is proximate to beacon 103. Mobile communication device 115 generates a new random code and transmits the third beacon identifier and the new random code to traffic monitor 106. Beacon 104 transmits a beacon signal indicating a fourth beacon identifier. Mobile communication device 115 receives the beacon signal indicating the fourth beacon identifier when device 115 is proximate to beacon 104. Mobile communication device 115 transmits the fourth beacon identifier and the new random code to traffic monitor 106. Traffic monitor 106 then processes the messages to determine the velocity of mobile communication device 115 between beacons 103-104.

Note that the change in the random code between beacons 102-103 prevented traffic monitor 106 from determining the velocity of mobile communication device 115 between beacons 102-103. However, traffic monitor 106 is able to determine the velocity of mobile communication device 115 at various points when the random code remains the same. Advantageously, the use of the changing random code allows the user to provide time and location data for velocity determination while remaining anonymous. The loss of velocity data at a few points may be acceptable for the increased anonymity provided by changing the ransom code. In alternative embodiments, the random code could always remain the same.

Figure 3:
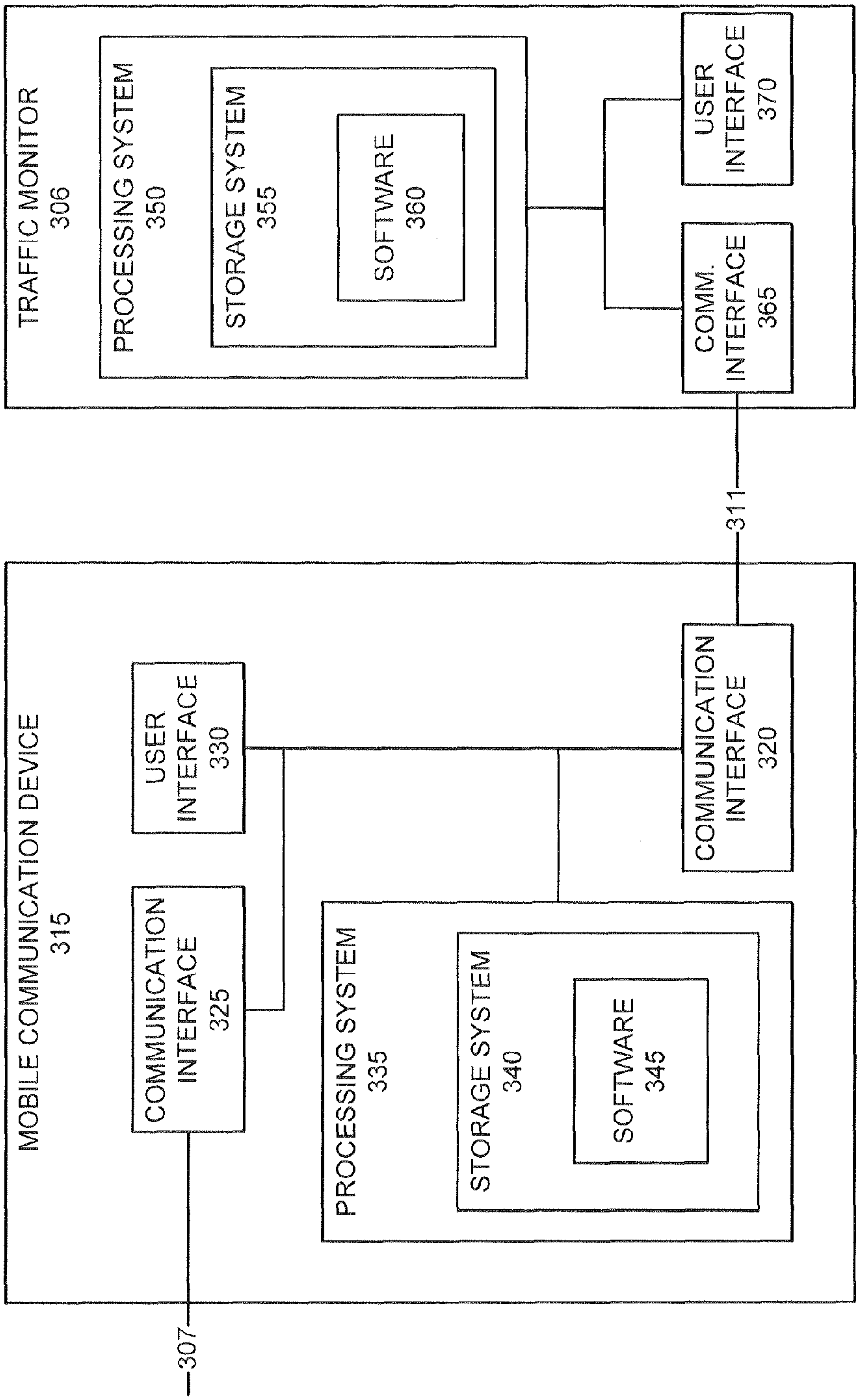
FIG. 3 illustrates a mobile communication device and a traffic monitor in an embodiment of the invention.

FIG. 3 illustrates mobile communication device 315 and traffic monitor 306 in an embodiment of the invention. Mobile communication device 315 comprises communication interface 320, communication interface 325, processing system 335, and user interface 330. Processing system 335 comprises storage system 340. Storage system 340 stores software 345. Processing system 335 is linked to communication interface 320, communication interface 325, and user interface 330. Mobile communication device 315 comprises a telephone, an internet appliance, or some other wireless transceiver and control circuitry. Mobile communication device 315 may be distributed among multiple devices that together comprise elements 320-345.

Traffic monitor 306 comprises communication interface 365, processing system 350, and user interface 370. Processing system 350 comprises storage system 355. Storage system 355 stores software 360. Processing system 350 is linked to communication interface 365 and user interface 370. Traffic monitor 306 could be comprised of a programmed general-purpose computer, although those skilled in the art will appreciate that programmable or special purpose circuitry and equipment may be used. Traffic monitor 306 may be distributed among multiple devices that together comprise elements 350-370.

Communication interface 320 and communication interface 365 communicate over link 311. Link 311 comprises a wireless communication link using Wi-Fi, WiMAX, CDMA, GSM, or some other form of wireless communication. Link 311 may be a direct wireless link or may comprise various intermediate systems and components.

Communication interface 325 is connected to beacon link 307 when mobile communication device 315 moves within proximity of one of the beacons (not shown). Typically, the beacons broadcast a beacon signal over a predetermined range (such as 30, 60, 90, 100, 300, or 500 feet) and communication interface 325 only receives the beacon signal when it is proximate to and in range of the transmitting beacon. Link 307 comprises Bluetooth, Wi-Fi, WiMAX, or any form of wireless communication that could transmit from the beacons to communication interface 325.

Communication interface 320 and communication interface 325 could comprise transceiver circuitry that provides Bluetooth, Wi-Fi, WiMAX, RF, CDMA, GSM or some other form of wireless communication. Communication interface 320 and communication interface 325 may be distributed among multiple communication devices. Processing system 335 could comprise a computer microprocessor, logic circuit, or some other processing device. Processing system 335 may be distributed among multiple processing devices. User interface 330 could comprise a keyboard, mouse, voice recognition interface, microphone and speakers, graphical display, touch screen, or some other type of user device. User interface 330 may be distributed among multiple user devices. Storage system 340 could comprise a memory drive, integrated circuit, disk, or some other memory device. Storage system 340 may be distributed among multiple memory devices.

In some embodiments, user interface 330 provides an application menu with various user options related to the traffic monitoring system. In some embodiments, the application menu comprises user options to reset the random code generated by mobile communication device 315, switch the monitoring system functionality on or off, and display velocity reports, real-time traffic reports, and maps comprising real-time traffic velocity data. For example, mobile communication device 315 may stop the reception of the beacon signals in response to a user input.

Processing system 335 retrieves and executes software 345 from storage system 340. Software 345 may comprise an operating system, utilities, drivers, networking software, and other software typically loaded onto a mobile communication device. Software 345 could comprise an application program, firmware, or some other form of machine-readable processing instructions. When executed by processing system 335, software 345 directs processing system 335 to operate as described herein.

Communication interface 365 could comprise a network interface, modem, port, transceiver, or some other communication device. Communication interface 365 may be distributed among multiple communication devices. Processing system 350 could comprise a computer microprocessor, logic circuit, or some other processing device. Processing system 350 may be distributed among multiple processing devices. User interface 370 could comprise a keyboard, mouse, voice recognition interface, microphone and speakers, graphical display, touch screen, or some other type of user device. User interface 370 may be distributed among multiple user devices. Storage system 355 could comprise a disk, tape, integrated circuit, server, or some other memory device. Storage system 355 may be distributed among multiple memory devices.

Processing system 350 retrieves and executes software 360 from storage system 355. Software 360 may comprise velocity determining software, an operating system, utilities, drivers, networking software, and other software typically loaded onto a computer system. Software 360 could comprise an application program, firmware, or some other form of machine-readable processing instructions. When executed by processing system 350, software 360 directs processing system 350 to operate as described herein.

Figure 4:
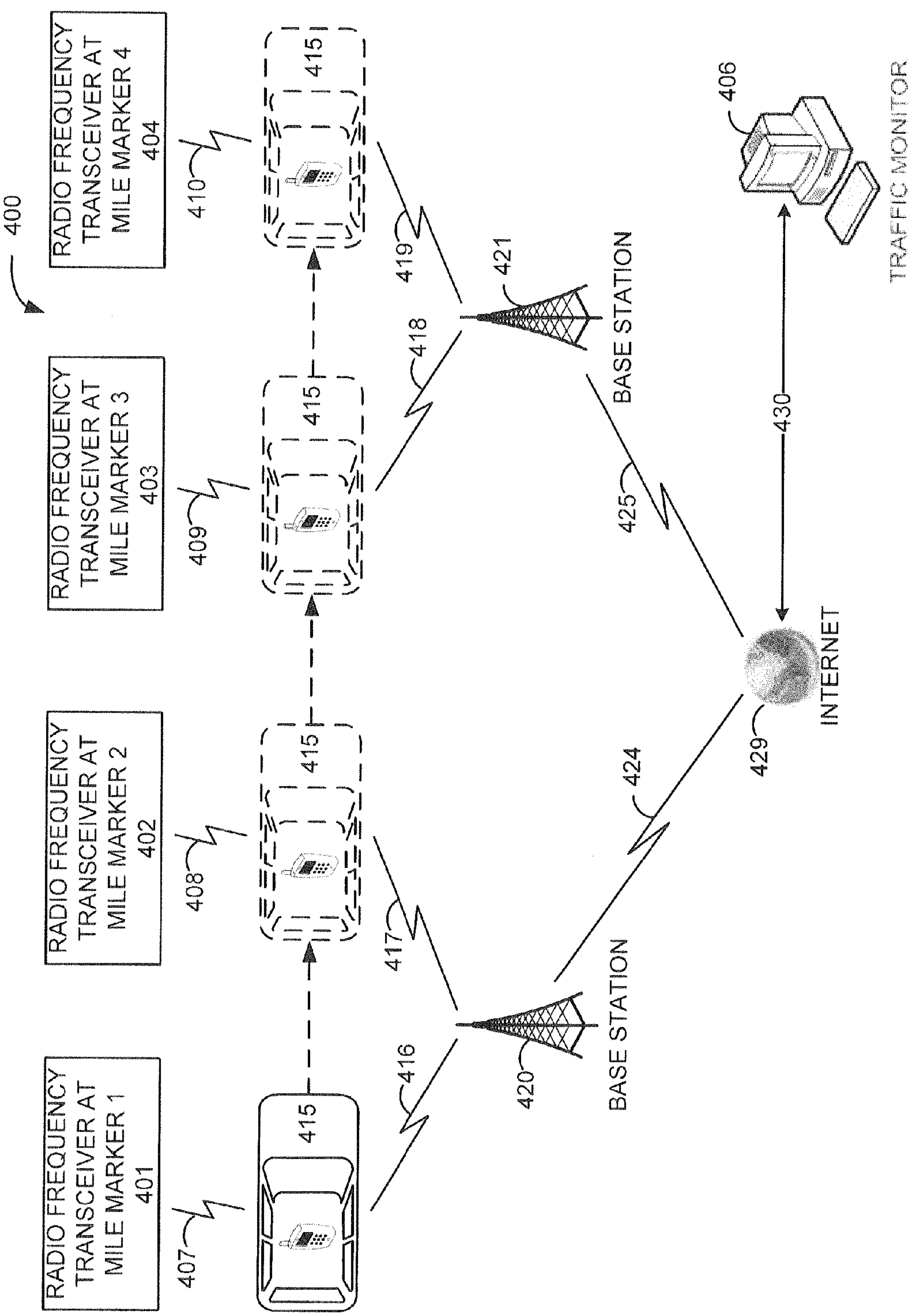
FIG. 4 illustrates a monitoring system in an embodiment of the invention.

FIG. 4 illustrates monitoring system 400 in an embodiment of the invention. Monitoring system 400 comprises Radio Frequency (RF) transceivers 401-404, wireless telephone 415, base stations 420 and 421, Internet 429, and traffic monitor 406. Wireless telephone 415 and RF transceivers 401-404 are coupled by wireless links 407-410, respectively. Wireless telephone 415 and base station 420 are coupled by wireless links 416 and 417. Wireless telephone 415 and base station 421 are coupled by wireless links 418 and 419. Internet 429 and base stations 420 and 421 are coupled by communication links 424 and 425, respectively. Internet 429 and traffic monitor 406 are coupled by communication link 430.

RF transceivers 401-404 are connected to roadside mile markers. RF transceivers 401-404 transmit beacon signals indicating their respective Global Positioning System (GPS) coordinates. The beacon signals have a range of 300 feet. RF transceivers 401-404 use solar power.

Wireless telephone 415 is located in a transportation device, such as an automobile traveling on a highway. Wireless telephone 415 generates a random code that is anonymous within monitoring system 400 and external systems. Wireless telephone 415 receives a beacon identifier when it is within 300 feet of one of beacons 401-404 over wireless links 407-410, respectively. In response to receiving the beacon identifier, wireless telephone 415 transmits a message comprising the beacon identifier, the random code, and a timestamp indicating the current time of day. Wireless telephone 415 generates a new random code in response to previously transmitting a pre-determined number of messages with the old random code or in response to the lapse of a time period. For example, wireless telephone 415 may generate a new random code after every 10 messages or after every 10 minutes. The random codes could be generated by a pseudo-random number generator within wireless telephone 415.

Traffic monitor 406 comprises a computer system. Traffic monitor 406 receives the messages from wireless telephone 415 via base stations 420 and 421 and Internet 429. Traffic monitor 406 may timestamp the messages upon receipt. Traffic monitor 406 processes the messages received from wireless telephone 415 to determine the velocity of the wireless telephone 415.

Traffic monitor 406 processes similar messages from a plurality of other mobile communication devices (not shown) to determine the velocity and volume of traffic in a particular geographic area. Traffic monitor 406 generates real-time velocity and volume traffic reports and maps. Traffic monitor 406 transmits the reports and maps to wireless telephone 415 and the other mobile communication devices. Traffic monitor 406 could transmit the reports and maps to various locations over Internet 429.

Figure 5:
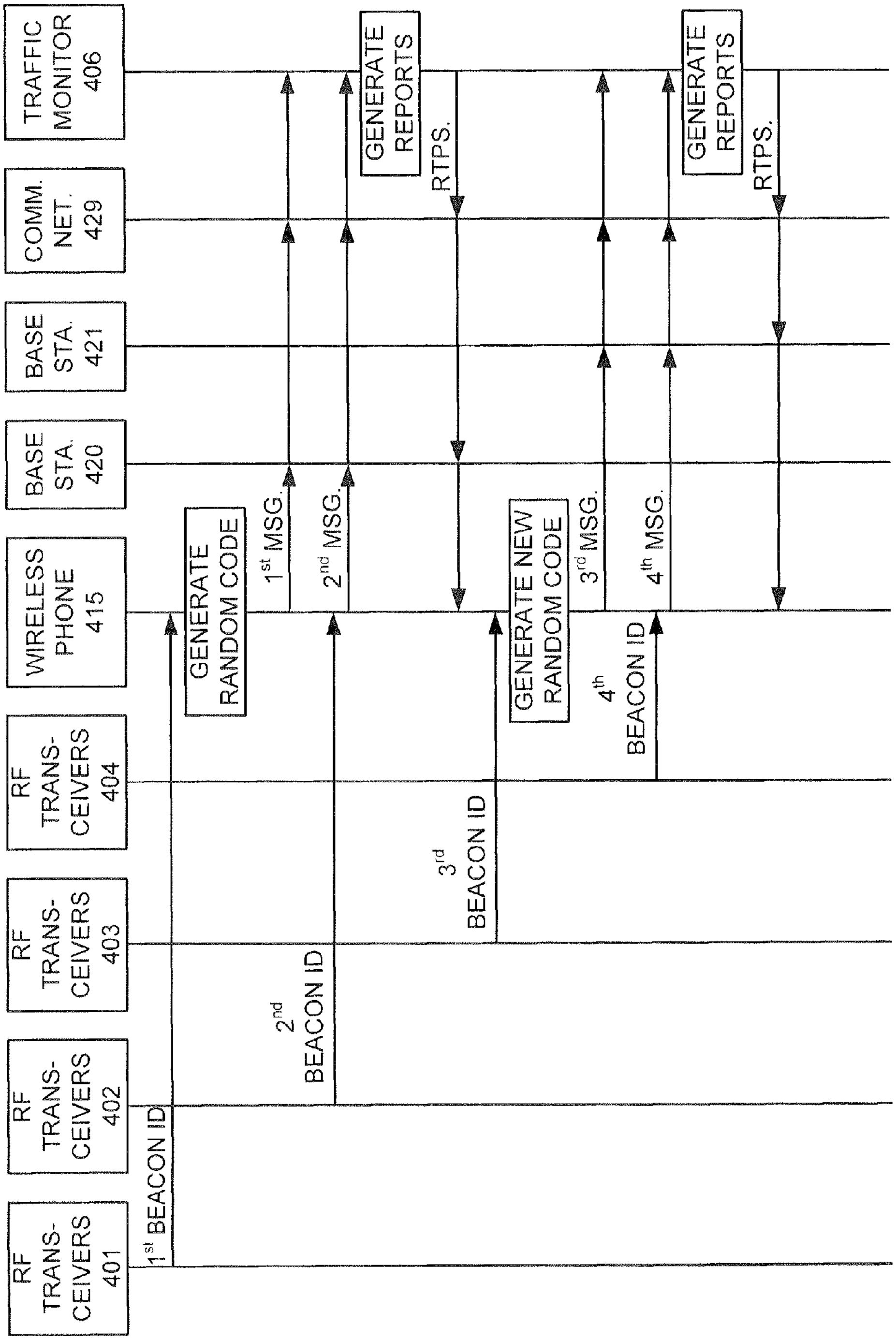
FIG. 5 illustrates the operation of the monitoring system in an embodiment of the invention.

FIG. 5 illustrates the operation of the monitoring system in an embodiment of the invention. When wireless telephone 415 is within 300 feet of RF transceiver 401, RF transceiver 401 transmits a signal indicating a first beacon identifier to wireless telephone 415. Wireless telephone 415 generates a random code and transmits a first message comprising the first beacon identifier, the random code, and a timestamp to traffic monitor 406 via base station 420 and Internet 429. When wireless telephone 415 is within 300 feet of RF transceiver 402, RF transceiver 402 transmits a signal indicating a second beacon identifier to wireless telephone 415. Wireless telephone 415 transmits a second message comprising the second beacon identifier, the random code, and a timestamp to traffic monitor 406 via base station 420 and Internet 429. Traffic monitor 406 then generates and transmits velocity and volume reports, real-time traffic reports, and maps comprising real-time traffic velocity and volume data to wireless telephone 415 via Internet 429 and base station 420.

When wireless telephone 415 is within 300 feet of RF transceiver 403, RF transceiver 403 transmits a signal indicating a third beacon identifier to wireless telephone 415. Wireless telephone 415 generates a new random code in response to previously transmitting the first and second messages with the old random code. Wireless telephone 415 then transmits a third message comprising the third beacon identifier, the new random code, and a timestamp to traffic monitor 406 via base station 421 and Internet 429. When wireless telephone 415 is within 300 feet of RF transceiver 404, RF transceiver 404 transmits a signal indicating a fourth beacon identifier to wireless telephone 415. Wireless telephone 415 transmits a fourth message comprising the fourth beacon identifier, the new random code, and a timestamp to traffic monitor 406 via base station 421 and Internet 429. Traffic monitor 406 then generates and transmits velocity reports, volume reports, real-time traffic reports, and maps comprising real-time traffic velocity and volume data to wireless telephone 415 via Internet 429 and base station 421.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for determining a velocity of a mobile communication device, the method comprising:

transmitting beacon signals indicating beacon identifiers from a plurality of beacons;

receiving a first one of the beacon signals indicating a first one of the beacon identifiers in the mobile communication device when the mobile communication device is proximate to a first one of the beacons;

generating a random code in the mobile communication device;

temporarily assigning the random code to the mobile communication device to allow the correlation of messages sent from the mobile communication device without identifying the mobile communication device;

transmitting a first message indicating the first beacon identifier and the random code from the mobile communication device;

receiving a second one of the beacon signals indicating a second one of the beacon identifiers in the mobile communication device when the mobile communication device is proximate to a second one of the beacons;

transmitting a second message indicating the second beacon identifier and the random code from the mobile communication device;

receiving the first message and the second message into a computer system;

processing the random code, the first beacon identifier, and the second beacon identifier to determine the velocity of the mobile communication device;

receiving a third one of the beacon signals indicating a third one of the beacon identifiers in the mobile communication device when the mobile communication device is proximate to a third one of the beacons;

generating a new random code in the mobile communication device;

temporarily assigning the new random code to the mobile communication device to allow the correlation of messages sent from the mobile communication device without identifying the mobile communication device;

transmitting a third message indicating the third beacon identifier and the new random code from the mobile communication device;

receiving a fourth one of the beacon signals indicating a fourth one of the beacon identifiers in the mobile communication device when the mobile communication device is proximate to a fourth one of the beacons;

transmitting a fourth message indicating the fourth beacon identifier and the new random code from the mobile communication device;

receiving the third message and the fourth message into the computer system; and processing the new random code, the third beacon identifier, and the fourth beacon identifier to determine the velocity of the mobile communication device.

2. The method of claim 1 wherein generating the new random code comprises generating the new random code in response to previously transmitting a number of messages with the random code.

3. The method of claim 1 wherein generating the new random code comprises generating the new random code in response to a time period lapsing.

4. The method of claim 1 further comprising:

in the mobile communication device, adding a first timestamp to the first message indicating when the first beacon signal was received and adding a second timestamp to the second message indicating when the second beacon signal was received; and in the computer system, processing the first timestamp and the second timestamp to determine the velocity of the mobile communication device.

5. The method of claim 1 further comprising:

in the computer system, associating a first timestamp with the first message indicating when the first message was received, associating a second timestamp with the second message indicating when the second message was received, and processing the first timestamp and the second timestamp to determine the velocity of the mobile communication device.

6. The method of claim 1 wherein the first beacon identifier indicates a geographic location for the first beacon.

7. The method of claim 1 wherein processing the first beacon identifier in the computer system comprises translating the first beacon identifier into a geographic location for the first beacon.

8. The method of claim 1 wherein the first beacon is a roadside beacon.

9. The method of claim 1 wherein the first beacon is connected to a mile marker.

10. The method of claim 1 wherein the first beacon is solar-powered.

11. The method of claim 1 wherein transmitting the first message comprises transmitting the first message over a mobile communication network.

12. The method of claim 1 further comprising in the mobile communication device turning off and on the reception of the beacon signals in response to a user input.

13. The method of claim 1 further comprising:

in the computer system, transferring the velocity of the mobile communication device to another mobile communication device.

14. A mobile communication device velocity monitoring system comprising:

a plurality of beacons configured to transmit beacon signals indicating beacon identifiers;

a mobile communication device configured to receive a first one of the beacon signals indicating a first one of the beacon identifiers when the mobile communication device is proximate to a first one of the beacons, generate a random code in the mobile communication device, temporarily assign the random code to the mobile communication device to allow the correlation of messages sent from the mobile communication device without identifying the mobile communication device, transmit a first message indicating the first beacon identifier and the random code, receive a second one of the beacon signals indicating a second one of the beacon identifiers when the mobile communication device is proximate to a second one of the beacons, transmit a second message indicating the second beacon identifier and the random code, receive a third one of the beacon signals indicating a third one of the beacon identifiers when the mobile communication device is proximate to a third one of the beacons, generate a new random code in the mobile communication device, temporarily assign the new random code to the mobile communication device to allow the correlation of messages sent from the mobile communication device without identifying the mobile communication device, transmit a third message indicating the third beacon identifier and the new random code, receive a fourth one of the beacon signals indicating a fourth one of the beacon identifiers when the mobile communication device is proximate to a fourth one of the beacons, and transmit a fourth message indicating the fourth beacon identifier and the new random code; and a computer system configured to receive the first message and the second message and process the random code, the first beacon identifier, and the second beacon identifier to determine a velocity of the mobile communication device, and to receive the third message and the fourth message and process the new random code, the third beacon identifier, and the fourth beacon identifier to determine the velocity of the mobile communication device.

15. The system of claim 14 wherein the mobile communication device is configured to generate the new random code in response to previously transmitting a number of messages with the random code.

16. The system of claim 14 wherein the mobile communication device is configured to generate the new random code in response to a time period lapsing.

17. The system of claim 14 further comprising:

the mobile communication device further configured to add a first timestamp to the first message indicating when the first beacon signal was received and add a second timestamp to the second message indicating when the second beacon signal was received; and the computer system further configured to process the first timestamp and the second timestamp to determine the velocity of the mobile communication device.

18. The system of claim 14 wherein the computer system is further configured to associate a first timestamp with the first message indicating when the first message was received, associate a second timestamp with the second message indicating when the second message was received, and process the first timestamp and the second timestamp to determine the velocity of the mobile communication device.

19. The system of claim 14 wherein the first beacon identifier indicates a geographic location for the first beacon.

20. The system of claim 14 wherein the computer system is configured to translate the first beacon identifier into a geographic location for the first beacon.

21. The system of claim 14 wherein the first beacon is a roadside beacon.

22. The system of claim 14 wherein the first beacon is connected to a mile marker.

23. The system of claim 14 wherein the first beacon is solar-powered.

24. The system of claim 14 wherein the mobile communication device is configured to transmit the first message through a mobile communication network.

25. The system of claim 14 wherein the mobile communication device is configured to turn on and off the reception of the beacon signals in response to a user input.

26. The system of claim 14 comprising the computer system further configured to transfer the velocity of the mobile communication device to another mobile communication device.

* * * * *